(12) United States Patent
Pfeil et al.

(10) Patent No.: US 12,429,556 B2
(45) Date of Patent: Sep. 30, 2025

(54) METHOD AND CONTROL UNIT FOR MONITORING A SENSOR SYSTEM

(71) Applicant: Robert Bosch GmbH, Stuttgart (DE)

(72) Inventors: Jerg Pfeil, Cleebronn (DE); Tim Dettling, Murr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 480 days.

(21) Appl. No.: 17/903,521

(22) Filed: Sep. 6, 2022

(65) Prior Publication Data

US 2023/0079545 A1   Mar. 16, 2023

(30) Foreign Application Priority Data

Sep. 15, 2021   (DE) .................... 10 2021 210 191.7

(51) Int. Cl.
*G01S 7/40*   (2006.01)
*G01S 13/89*   (2006.01)

(52) U.S. Cl.
CPC ............... *G01S 7/40* (2013.01); *G01S 13/89* (2013.01)

(58) Field of Classification Search
None
See application file for complete search history.

(56) References Cited

U.S. PATENT DOCUMENTS

2020/0090322 A1\* 3/2020 Seo ................. G06N 3/084
2022/0018961 A1\* 1/2022 O'Keeffe ............. G01S 17/10

FOREIGN PATENT DOCUMENTS

DE   19945268 A1   3/2001

\* cited by examiner

*Primary Examiner* — Whitney Moore
(74) *Attorney, Agent, or Firm* — NORTON ROSE FULBRIGHT US LLP

(57) ABSTRACT

A method for monitoring a sensor system. Sensor data of the sensor system are read in and information of the sensor data from different elevations of the sensor data is projected as image data into an azimuthal image plane. The information from at least two image areas of the image plane is evaluated in a spatially resolved manner in order to recognize a local sensor blindness of the sensor system. A blindness notification for an image area is output if the sensor blindness is recognized in the image area.

10 Claims, 2 Drawing Sheets

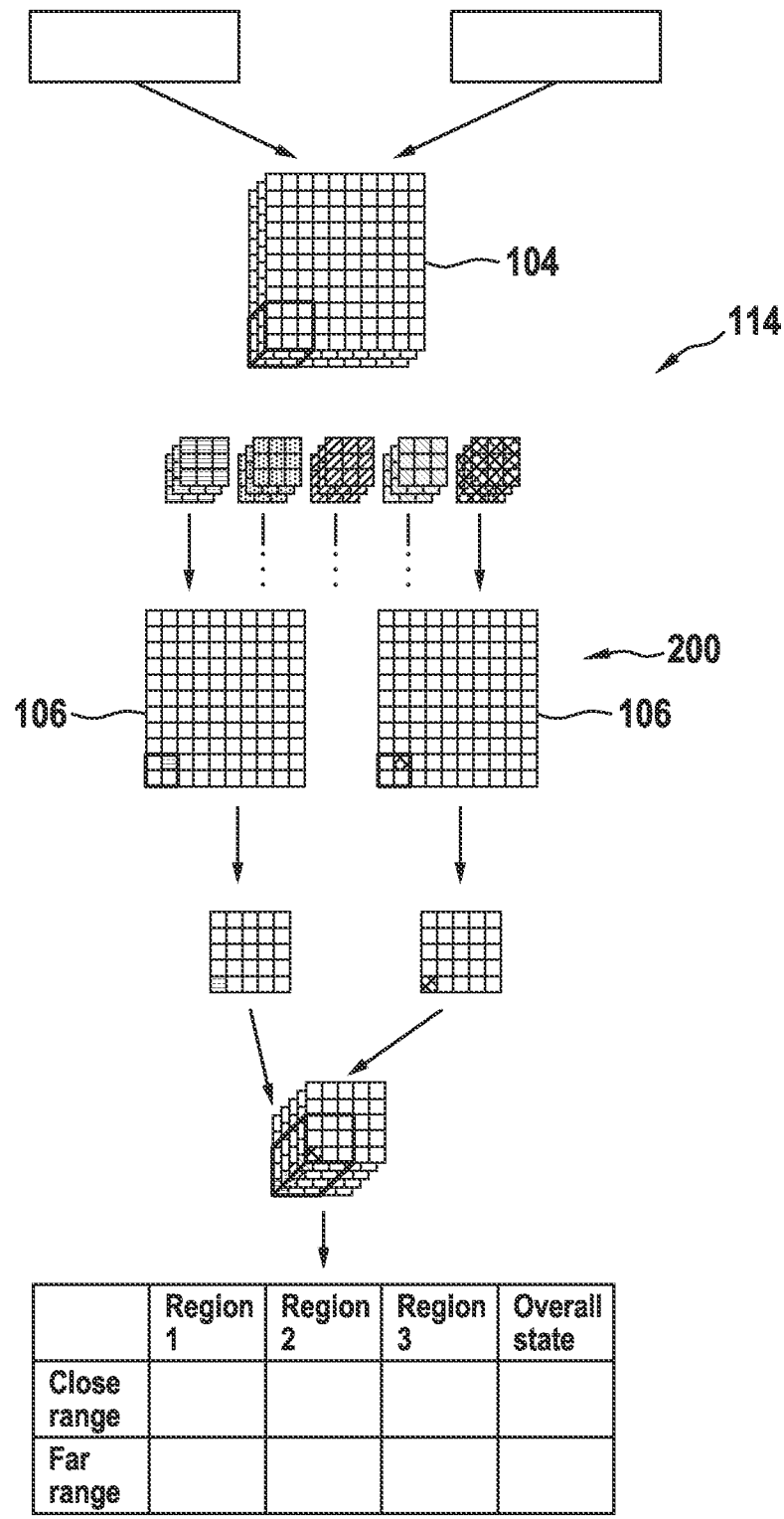

METHOD AND CONTROL UNIT FOR MONITORING A SENSOR SYSTEM

CROSS REFERENCE

The present application claims the benefit under 35 U.S.C. § 119 of German Patent Application No. DE 10 2021 210 191.7 filed on Sep. 15, 2021, which is expressly incorporated herein by reference in its entirety.

FIELD

The present invention relates to a method for monitoring a sensor system, to a corresponding control unit, and to a corresponding computer program product.

BACKGROUND INFORMATION

A sensor system may detect a detection area actively or passively and map information about objects in the detection area into sensor data. If there is a disturbance between the sensor system and the detection area, the sensor system may map information about the disturbance in the sensor data, at least in part. The disturbance may then at least in part obscure or distort the detection area or render the received data unusable. The sensor system can, at least in part, no longer or no longer properly detect objects in that portion of the detection area that is affected by the disturbance. This disturbed state can be referred to as "sensor blindness".

Sensor blindness can be recognized with the aid of different features. In this case, the sensor can be recognized either as blind, partially blind or not blind.

For example, German Patent Application No. DE 19 945 268 A1 describes a method and a device for identifying the state of a system for effecting the automatic longitudinal and/or lateral control of a motor vehicle.

SUMMARY

The present invention provides, a method for monitoring a sensor system, a corresponding control unit, and also a corresponding computer program product. Advantageous developments of and improvements in the present invention will become apparent from the disclosure herein.

In conventional blindness recognition, a sensor in the event of a disturbance between the sensor and its detection area is classified either as completely blind or as not blind. In this case, the sensor may be classified as blind if the detection area is only partially obscured by the disturbance. The sensor may likewise be classified as not blind if the disturbance partially obscures the detection area. If the sensor is classified as blind, sensor data of the sensor are no longer used for a further evaluation.

With the approach of blindness recognition presented here according to the present invention, sensor data of a sensor system are converted into image data using at least one sensor, and the classification as blind or not blind is carried out in a regionally spatially resolved manner. The sensor data are projected into an image plane for conversion into the image data. The image plane in this case is oriented in particular parallel to the ground. The blindness recognition is carried out for different areas of the detection area independently of each other. As a result, the sensor data from an area classified as not blind can continue to be used, while sensor data from an area classified as blind do not continue to be used.

Additionally, according to an example embodiment of the present invention, three-dimensional sensor data are compressed into two-dimensional image data in order to simplify the blindness recognition. The blindness recognition can thus be executed using reduced computing power.

According to an example embodiment of the present invention, a method for monitoring a sensor system is provided, wherein sensor data of the sensor system are read in and information of the sensor data from different elevations of the sensor data is projected as image data into an azimuthal image plane, wherein the information from at least two image areas of the image plane is evaluated in a spatially resolved manner in order to recognize a local sensor blindness of the sensor system, wherein a blindness notification for an image area is output if the sensor blindness is recognized in the image area.

Ideas relating to specific embodiments of the present invention may be regarded, inter alia, as being based on the concepts and findings described below.

A sensor system may comprise at least one active sensor. The sensor may for example be a radar sensor, a lidar sensor or an ultrasonic sensor. The sensor system may also comprise a plurality of sensors. The sensor system may in particular be a sensor system of an autonomous or partially autonomous vehicle.

According to an example embodiment of the present invention, information of the sensor data may map features of objects in a detection area of the sensor system or alternatively base them on the raw data of the sensor. The information may map attributes of the objects. The sensor data may contain distance information and angle information of the objects in relation to the sensor. The angle information may be in particular a solid angle relative to a reference direction of the sensor. The angle information may comprise an azimuth and an elevation. In other words, the information in the sensor data can be mapped from a sensor perspective. The image data can be mapped from a bird's-eye perspective.

The information may however also map a disturbance between a sensor and the detection area. The disturbance may for example be dirt, ice, snow, slush or an object swirling up. The disturbance may cause distortion and/or absorption. The distortion may corrupt in particular the angle information. The distortion may therefore distort the item of information. The absorption may in particular reduce a range of the sensor. The absorption may attenuate a sensor signal. Disturbances may lead to sensor blindness.

When information is projected into an image plane, the angle information and the distance information of an item of information become coordinates of an image point of the item of information. In the projection, the azimuth of the angle information can be used and the elevation of the angle information discarded.

At least two image areas that are evaluated independently of each other may be defined in the image plane. The image areas may be evaluated for example using a neural network. The neural network may have been trained to evaluate the image areas and recognize disturbances using training data. If a particular portion of an image area is disturbed, the sensor blindness for this image area can be recognized.

A blindness notification can be provided for subsequent processing steps. Due to the blindness notification of an image area, the information from the affected image area can be discarded or ignored.

According to an example embodiment of the present invention, the items of information projected into an image area can be combined to form overall information of the image area. The information of an image area may for example be averaged, i.e. an average value determined for the image area. The averaging may in this case be weighted. The combining to form overall information means that a volume of data can be substantially reduced or compressed and the evaluation can be speeded up.

According to an example embodiment of the present invention, sensor data of at least two sensors of the sensor system can be read in. The sensors may have overlapping detection areas. In a region of overlap of the detection areas the sensor data can be superimposed. Thus information from a plurality of sensors can be projected into the same image area. In this case for example the one sensor for the image area may detect a disturbance and be sensor-blind, while the other sensor is not disturbed and as a result is not sensor-blind either. The information of the non-disturbed sensor can be further processed. The information of the disturbed sensor can be ignored. As a result, the image area can continue to be monitored even if one sensor is disturbed. Furthermore, a status for the entire system can be determined.

According to an example embodiment of the present invention, the sensor data of at least two different sensors of the sensor system can be read in. The sensor data of different types sensors can be fused. Thus a disturbance that relates only to sensors of one type cannot disturb the other type of sensor. The sensor data of the disturbed sensor can be ignored.

According to an example embodiment of the present invention, information from one elevation area of the sensor data can be projected into the image plane. Thus only a section of the sensor data can be projected into the image plane. Information outside of the elevation area is not projected into this image plane. For the projection into the image plane a section of the sensor data that is of interest can be defined by a predetermined elevation area. The elevation area in this case represents a preselection of the information and can reduce a volume of data that is to be evaluated.

According to an example embodiment of the present invention, information from at least two different elevation areas can be projected into different image planes. Per image plane, the information from at least two image areas can be evaluated in a spatially resolved manner. Due to different elevation areas, the detection area can be monitored in portions. A plurality of image planes yields spatial resolution of the sensor blindness recognition.

According to an example embodiment of the present invention, a size and/or the spatial resolution and/or a number of the image areas can be set dependent on the situation. For example, the size and/or the spatial resolution and/or number can be set dependent on a current driving situation of the vehicle. For example, the recognition of sensor blindness may be important in different areas of the detection area in different driving situations. When parking, for example, areas close around the vehicle may be important, while far areas are less important. In freeway driving, on the other hand, the close areas may be less important, while the far areas are important. In the far areas, relatively small image areas can also be evaluated, since the detection area in the far areas is mapped smaller than in the close areas.

The image data may be aggregated with metadata of the sensor data. Further information may be assigned to the image points in the image plane. For example, an existence probability and/or variance of the individual attributes and/or the density of the reflections of an object at the image point can be aggregated. The recognition of the sensor blindness in an image area can be improved by metadata.

The method may be implemented for example in software or hardware or in a hybrid form of software and hardware for example in a control unit.

The present invention further provides a control unit that is configured to perform, control or implement the steps of a variant of the method provided according to the present invention, in corresponding devices.

The control unit may be an electrical device including at least one processing unit for processing signals or data, at least one memory unit for storing signals or data, and at least one interface and/or one communication interface for reading in or outputting data that are embedded in a communication protocol. The processing unit may for example be a signal processor, a so-called system ASIC or a microcontroller for processing sensor signals and outputting data signals dependent on the sensor signals. The memory unit may be for example a flash memory, an EPROM or a magnetic memory unit. The interface may be configured as a sensor interface for reading in the sensor signals from a sensor and/or as an actuator interface for outputting the data signals and/or control signals to an actuator. The communication interface may be configured to read in or output the data wirelessly and/or in a wired manner. The interfaces may also be software modules which for example are present on a microcontroller in addition to other software modules.

A computer program product or computer program with program code that can be stored on a machine-readable support or storage medium such as a semiconductor memory, a hard disk memory or an optical memory and is used to perform, implement and/or control the steps of the method according to one of the specific embodiments of the present invention is also advantageous, in particular if the program product or program is executed on a computer or device.

It is pointed out that some of the possible features and advantages of the present invention are described herein with reference to different specific embodiments. A person skilled in the art will recognize that the features of the control unit and of the method can be suitably combined, adapted or replaced in order to arrive at further specific embodiments of the present invention.

BRIEF DESCRIPTION OF THE DRAWINGS

Below, specific embodiments of the present invention will be described with reference to the figures: neither the figures nor the description are to be interpreted as restricting the present invention.

FIG. 2 shows a sequence of a sensor blindness recognition according to one example embodiment of the present invention.

The figures are merely schematic and not true to scale. Identical reference numerals designate identical features or features having the same effect in the figures.

DETAILED DESCRIPTION OF EXAMPLE EMBODIMENTS

Figure 1:
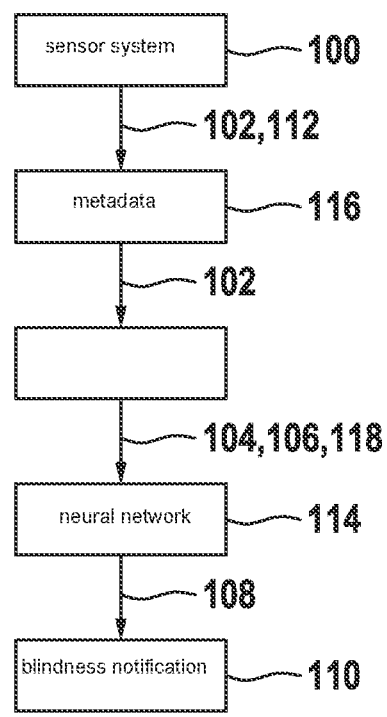
FIG. 1 is a flowchart of a method according to one example embodiment of the present invention.

FIG. 1 is a flowchart of a method for monitoring a sensor system 100 according to one embodiment of the present invention. In a first step, sensor data 102 of the sensor system 100 are read in. In a second step, the sensor data 102 are converted into image data 104. In a third step, image areas 106 of the image data 104 are evaluated in a spatially resolved manner in order to recognize a local sensor blindness 108 of the sensor system 100. In a fourth step, a blindness notification 110 for an image area 106 recognized as sensor-blind is output.

The sensor system 100 is installed for example in an autonomous or partially autonomous vehicle. The sensor system 100 detects a detection area and maps information 112 about objects detected in the detection area in the sensor data 102. The detection area covers at least a portion of the area surrounding the vehicle. The information 112 in this case comprises at least one item of location information formed from an item of distance information and an item of angle information in relation to a detected object. The distance information and the angle information in this case are embedded in the sensor data 102 from a sensor perspective of a detecting sensor. The angle information in this case is in the form of an azimuth and an elevation relative to an orientation of the sensor. The azimuth, for example in the case of a sensor oriented forwards in the vehicle, designates a lateral direction, and the elevation in this case designates a vertical direction.

Upon conversion into the image data 104, information 112 is projected into an azimuthally oriented image plane. The image plane may be referred to as a "grid". With the sensor oriented forwards on the vehicle, the image plane is therefore oriented substantially horizontally. The distance information and the azimuth in this case are used as coordinates of an image point of an item of information 112. The elevation is ignored. As a result, three-dimensional sensor data 102 are converted into two-dimensional image data 104.

Upon evaluation, the image areas 106 are evaluated for sensor blindness 108 independently of each other. Sensor blindness 108 in one of the image areas 106 does not affect the evaluation of the other image areas 106. The evaluation is done by a trained neural network 114. The neural network 114 evaluates the image areas 106 using image recognition methods. The neural network 114 recognizes indications of sensor blindness 108 with the aid of previously learned features.

In one embodiment, the information 112 of the sensor data 102 is aggregated with metadata 116 of the sensor data 102 prior to conversion into the image data 104. As a result, the image points of the image data 104 have an increased information content.

In one embodiment, the image data 104 are compressed prior to evaluation. In this case, the items of information 112 of all the image points within an image area 106 are combined to form overall information 118. The information 112 may for example be averaged weighted in order to obtain the overall information 118.

In one embodiment, sensor data 102 of a plurality of sensors of the sensor system 100 are read in, projected together into the image plane, and evaluated. In this case, sensor data 102 of sensors having different principles of operation can also be projected together. As a result, the sensor blindness 108 of one or more of the sensors can be recognized particularly effectively.

In one embodiment, the sensor data 102 are projected into different azimuthally oriented image planes. In this case, in each case items of information from a predetermined elevation area are projected together into one image plane. Items of information with similar elevations can thus be evaluated jointly. Resolution of the blindness recognition is increased by a plurality of image planes.

In one embodiment, a size of the image areas 106 is set dependent on the situation. With smaller image areas 106, a larger number of the image areas 106 can be evaluated. As a result of smaller and more image areas 106, the blindness recognition can be carried out with increased resolution and accuracy. As a result of larger and fewer image areas 106, the blindness recognition can be carried out with reduced consumption of resources.

In one embodiment, a position of the image areas 106 is set dependent on the situation. As a result, the blindness recognition can be executed at different positions of the detection area depending on the situation. Areas of the detection area that are unimportant in a particular situation can thus be ignored and resources concentrated on areas that are important in this situation.

FIG. 2 shows a sequence of sensor blindness recognition according to one embodiment. The image recognition in this case is part of the method for monitoring a sensor system depicted in FIG. 1. The image data 104 are read in and evaluated by the neural network 114. The neural network 114 compresses the image data 104 of the image areas 106 into a latent space 200 and extracts from them previously learned features of the sensor blindness. The neural network 114 in this case uses methods of image processing in order, even prior to the projection into the image plane, to be able to investigate sensor data that are not present in graphic form for sensor blindness.

In one embodiment, the image areas 106 correspond to regions of the detection area. In this case, here for example three regions at a short distance from the sensor and three regions at a great distance from the sensor are investigated for sensor blindness. Additionally, an overall state of the regions at a short distance and an overall state of the regions at a great distance are output.

In other words, a method for improved blindness recognition is presented.

The blindness recognition of radar sensors is essential in order to be able to assess the integrity of the sensor signals. For the recognition of blindness, various indicators on various abstraction levels, such as for example raw signal, perception and situation analysis, can be calculated and aggregated. The indicators in such case can be calculated from the whole or a partial section of the detection area (sensor FOV). The indicators in such case predominantly form the physical effects distortion and absorption. The aggregated item of information from the indicators ultimately represents a single blindness status (BLIND/NOT_BLIND) for the entire sensor or the entire FOV.

For autonomous applications, increasingly more accurate information about the sensor blindness is required. In such case, for example the recognition of blindness for individual parts of the sensor FOV, the recognition of the degree of severity of the blindness (for example degree of damping by absorption), or the recognition of the blindness status of the entire system consisting of a plurality of sensors should be mentioned.

The present methodology shows one possibility of more accurate blindness recognition for the purpose of localization for partial/segmented blindness, and improved recognition by novel processing of the features extracted from the radar perception. This methodology enables the introduction of a plurality of features, the partial blindness recognition of the sensor, the determination of the features over a plurality of sensors, and the improvement in recognition methodology by the utilization of data-driven algorithms. Furthermore, existing, proven indicator concepts can easily be integrated in the methodology.

The present methodology makes it possible to recognize segment-wise/partial blindness, to increase the availability of the sensors or individual functions, to assess the entire system from a plurality of sensors, and to improve the recognition methodology.

In so doing, the measured reflections (locations) including their attributes are used as a basis for ascertaining the state of the sensor or of the entire system. As a result, the sometimes costly calculation of indicators is dispensed with and in addition the recognition of blindness is improved. By using data-driven methods, in addition both an improvement during operation and rapid adaptation to new systems can take place. Furthermore, the methodology delivers more accurate or better segmented information, such as for example a degree of the blindness and/or a system impairment for individual regions.

The radar perceives the surroundings and, based on this, generates reflections consisting of a multiplicity of attributes, such as for example position, angle qualities in elevation and azimuth angle, and radar cross-section. These are utilized as the basis for the method in order to determine the blindness. In this case, the locations and their attributes, such as existence probability, position, etc., are processed in order to obtain information such as the density of reflections or cumulative existence probability, intensity, constancy or similar features.

With the approach presented here, the features of locations of different elevation are projected into one or more azimuthal image planes (x-y plane, see "bird's-eye view"), the features being averaged (weighted) depending on discretization (dx, dy, dz cell size) of the image plane from a plurality of locations. Depending on available resources, the partial blindness recognition can be made dynamic by way of the discretization of the grid, which may for example be marked in a size of 1° and 5 m in length. In this case, the grid, which contains the locations with the corresponding attributes as a feature, can be changed dynamically during travel. Thus in situations of high speed, for example when driving on freeways, the cells of the grid can be designed to be larger in order to be able to map a greater range. In urban driving scenarios, the cells of the grid may be designed to be smaller and thus the surrounding area can be divided up more accurately. Furthermore, in unsafe situations the grid can be focused onto a particular part of the detection area. For example, in poor weather conditions the grid can be focused on that part of the detection area which is indispensable for the driving situation and thus increased resolution can be achieved here. This may, inter alia, be done in a manner adapted to the current driving situation or to the surrounding area.

By the projection of the indicators/features, such as for example the density of ground clutter or the attributes of the measured reflections, such as for example intensity and constancy, or the like, for recognition of the blindness into the image plane and the subsequent processing, data-driven methods such as for example convolutional neural networks (CNNs) from image processing, which can interpret the information comparably to the color information of an image, can be used. The data-driven method can obtain this capability by training on the basis of training data containing the corresponding features and sensor information. This yields improved blindness recognition, which, to the same extent and without changing the methodology, can be transferred to a plurality of sensors or sensor modalities by superposing the sensor locations, so that a current and possibly superposed image is produced, from which areas around the vehicle currently no integral information is delivered. The output can thus be divided up into various dimensions and thereby enables partial blindness recognition that can be divided up in azimuth, but also dependent on the distance (azimuthal and radial segmentation).

In one embodiment, segmentation can be carried out according to elevation planes and for each plane an area of the elevation can be cumulated. In this case, a plurality of x-y planes can be used for different elevations. Thus by using a plurality of layers the resolution in the elevation area can be increased at will. Furthermore, thus data-driven methods that enable merely a 2D input can also be used. In addition, the granularity of the elevation resolution can be increased virtually at will.

In one embodiment, superposition of a plurality of radars or sensors occurs. Thus not only one sensor is used as the input of the method, but a combination of a plurality of radar sensors or further sensor modalities, such as for example lidars, are used as the input, in order to deliver a uniform image, which parts of the field of view (FOV) can deliver reliable information in relation to the surroundings. Thus by central processing a higher-level, finely structured statement can be made as to whether parts of the field of view (FOV) cannot be covered by any sensor or a granular statement of the quality of the recognition can be made.

The principle of operation presented here can also be applied and transferred accordingly to other active sensor modalities, such as lidars, ultrasonic sensors, even without the use of radars.

Finally, it should be pointed out that terms such as "having", "comprising", etc. do not exclude any other elements or steps, and terms such as "a" or "one" do not exclude a multiplicity.

What is claimed is:

1. A method for monitoring a sensor system, the method comprising:
   reading in sensor data of the sensor system;
   projecting information of the sensor data from at least two different elevation areas of the sensor data as image data into at least two different image planes;
   evaluating information from at least two image areas of the image planes in a spatially resolved manner in order to recognize a local sensor blindness of the sensor system; and
   outputting a blindness notification for an image area of the at least two image areas based on the local sensor blindness being recognized in the image area, wherein subsequent information corresponding to the image area is discarded and/or ignored based on the outputting of the blindness notification for the image area.

2. The method as recited in claim 1, wherein items of the information projected into each image area are combined to form overall information of the image area.

3. The method as recited in claim 1, wherein the sensor data includes sensor data of at least two sensors of the sensor system.

4. The method as recited in claim 1, wherein the sensor data includes sensor data of at least two different sensors of the sensor system.

5. The method as recited in claim 1, wherein, for each image plane of the image planes, the information from at least two image areas is evaluated in a spatially resolved manner.

6. The method as recited in claim 1, wherein a size and/or number of the image areas is set dependent on a situation.

7. The method as recited in claim 1, wherein the image data are aggregated with metadata of the sensor data.

8. The method as recited in claim 1, further comprising:
  determining whether the sensor data includes three-dimensional (3D) sensor data; and
  converting, in response to determining that the sensor data includes 3D sensor data, the 3D sensor data to two-dimensional (2D) sensor data.

9. A control unit configured to monitor a sensor system, the control unit configured to:
  read in sensor data of the sensor system;
  project information of the sensor data from at least two different elevation areas of the sensor data as image data into at least two different image planes;
  evaluate information from at least two image areas of the image planes in a spatially resolved manner in order to recognize a local sensor blindness of the sensor system; and
  output a blindness notification for an image area of the at least two image areas based on the local sensor blindness being recognized in the image area, wherein the control unit is further configured to discard and/or ignore subsequent information corresponding to the image area based on the output blindness notification for the image area.

10. A non-transitory machine-readable storage medium on which is stored a computer program for monitoring a sensor system, the computer program, when executed by a processor, causing the processor to perform the following steps:
  reading in sensor data of the sensor system;
  projecting information of the sensor data from at least two different elevation areas of the sensor data as image data into at least two different image planes;
  evaluating information from at least two image areas of the image planes in a spatially resolved manner in order to recognize a local sensor blindness of the sensor system; and
  outputting a blindness notification for an image area of the at least two image areas based on the local sensor blindness being recognized in the image area, wherein subsequent information corresponding to the image area is discarded and/or ignored based on the outputting of the blindness notification for the image area.

* * * * *